E. T. WINKLER.
REGULATING VALVE.
APPLICATION FILED FEB. 11, 1910.
982,195.
Patented Jan. 17, 1911.
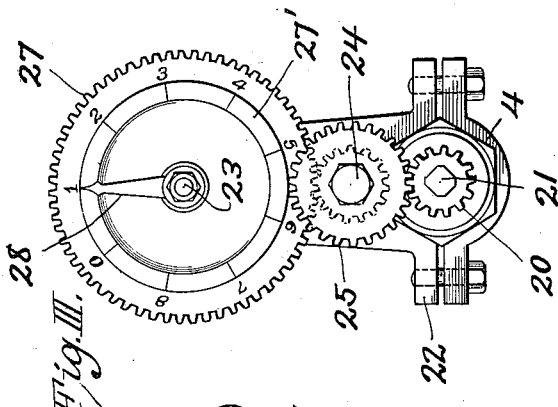
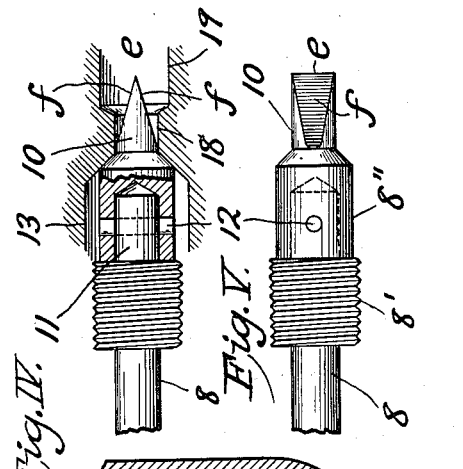
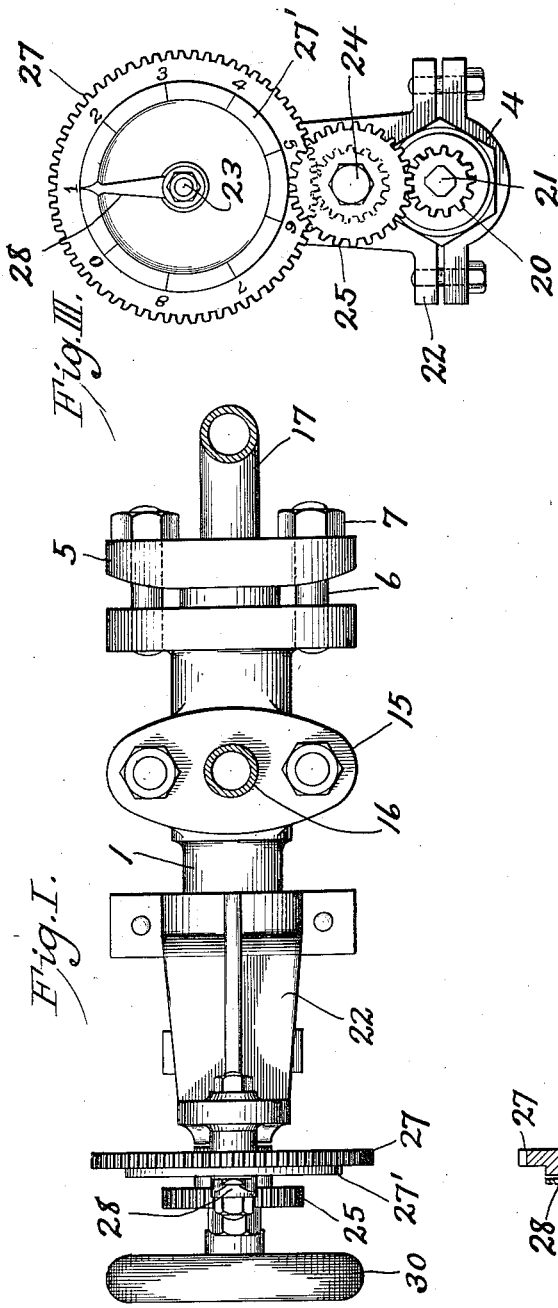
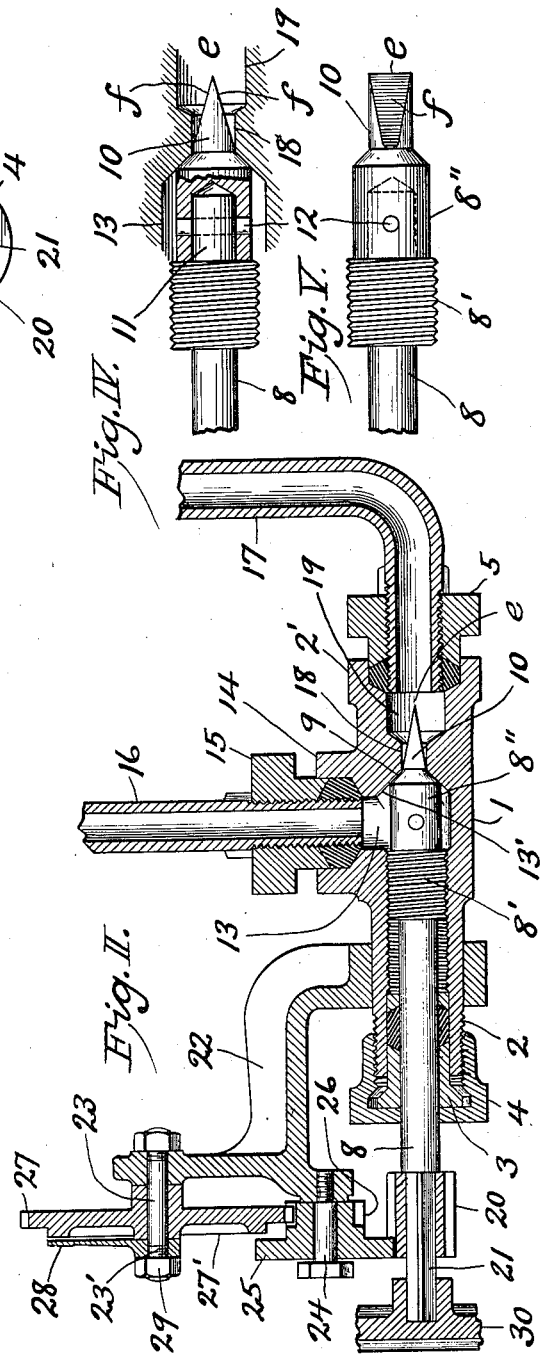
WITNESSES:
INVENTOR.
E. T. Winkler.
BY
ATTORNEY.

UNITED STATES PATENT OFFICE.

EHREGOTT T. WINKLER, OF KANSAS CITY, MISSOURI, ASSIGNOR OF ONE-HALF TO J. W. ROBERTS, OF KANSAS CITY, MISSOURI.

REGULATING-VALVE.

982,195. Specification of Letters Patent. Patented Jan. 17, 1911.

Application filed February 11, 1910. Serial No. 543,240.

*To all whom it may concern:*

Be it known that I, EHREGOTT T. WINKLER, a citizen of the United States, residing at Kansas City, in the county of Jackson and State of Missouri, have invented certain new and useful Improvements in Regulating-Valves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to regulating valves for controlling the flow of liquids; and has special reference to such valves for controlling the flow of hydrous ammonia, or other refrigerating medium, from a condenser to refrigerating coils.

The objects of the invention are, first, to provide a registering valve which will register or indicate upon a dial the degree of opening of the valve at any time; second, to provide a valve which will increase or decrease the flow uniformly for every rotation thereof. In explanation of this I will state that valves made with screw threads for moving the valve lengthwise by rotation, and having conical tips, do not increase or decrease, uniformly, the flow of a liquid thereby, as the valve is opened or closed.

The above named objects are accomplished by the construction presently described, and illustrated in the accompanying drawings, in which:—

Figure I is a plan view of a regulating valve constructed in accordance with my invention. Fig. II is a central longitudinal section of same, with connections. Fig. III is an end elevation of the valve, omitting the operating wheel. Fig. IV is a section of the valve proper and its seat, and Fig. V is a detail view of the valve proper, seen at right angles to Fig. IV.

Referring more in detail to the parts:—
1 designates the valve body, or valve chamber, provided with a stuffing box 2 at one end and a stuffing box 2' at the opposite end. Gland 3 is held in place by a screw cap 4, and gland 5 is held in place by bolts 6 and nuts 7.

The valve rod, 8, passes through cap 4 and gland 3, and is provided with an enlarged screw threaded part 8'. Beyond part 8' it is again reduced, as at 8'', and has an inclined shoulder 9, beyond which is the valve tip 10. This tip is formed by turning it cylindrical, then cutting it away to an edge $e$ at the end thereof, thus providing two flat, converging faces $f$. I prefer to make this tip separate from an extension 11 of threaded part 8', and to secure it thereon by a pin 12.

The valve body 1 is provided with a chamber 13 surrounding the part 8'', and in the upper part of said chamber is a stuffing box 14 provided with a gland 15. Glands 15 and 5 are internally threaded to receive pipes 16 and 17, respectively. One end of chamber 13 has a conical seat 13', fitting the inclined shoulder 9. Concentric with seat 13' is a reduced bore 18 which fits the valve tip 10. Beyond said bore 18 is an enlarged bore 19.

The registering attachment comprises a dial, a pointer, and gears or gearing between the valve rod and the dial or pointer. Either the dial or the pointer may be the revoluble member. In the construction shown, a pinion 20 is fixed upon the squared end 21 of the valve rod. A bracket 22 is mounted rigidly upon the valve body, and supports two stub-shafts 23 and 24. On shaft 24 is a gear 25 meshing with pinion 20, and a pinion 26. On shaft 23 is a gear 27, meshing with pinion 26. Shaft 23 is projected and threaded at 23', and threaded on said part is a pointer 28, made secure by a nut 29. The anterior face of gear 27 provides a dial, 27', which is provided with radial marks, as shown, arranged to register with the pointer 28. On the squared end 21 of the valve rod, a detachable hand wheel 30 is placed.

In a refrigerating plant, the pipe 17 leads to one of the vaporizing coils, and pipe 16 leads to a condenser, or to a manifold supplied from the condenser. The valve thus controls the flow of liquid from the manifold or condenser to the vaporizing coil. When the valve rod 8 is rotated, the rate of flow of the liquid will be increased or decreased by the same amount at every turn of the valve rod, regardless of whether the valve passage be nearly fully open, nearly closed, or in any intermediate position. This effect is due to the described formation of chisel shaped valve tip 10. As pinion 20 rotates, it turns gear 25 and pinion 26; the latter turns gear 27 which carries the dial 27'. The extent of opening of the valve will of course be indicated by the position of the dial marks, which are numbered or lettered. The valve tip 10 may be retracted until it lies within the chamber 13, leaving the bore 18 wholly unobstructed.

Having thus described my invention, what I claim as new therein and desire to secure by Letters-Patent is:—

1. A valve body having a valve seat, and a screw valve mounted in said body, said valve having a chisel-shaped tip, whereby the area of the valve opening will be equally varied by every equal rotative movement of the valve.

2. A valve body having a valve seat and a cylindrical bore opening upon the seat, in combination with a valve proper having a chisel-shaped tip adapted to rotate within said bore, said valve proper being threaded into the valve body.

3. A valve body having a valve seat and a cylindrical bore opening upon the seat, said body having internal screw threads, in combination with a valve proper having threads engaging said threads, and having a chisel-shaped tip adapted to rotate within said bore.

In testimony whereof I affix my signature in presence of two witnesses.

EHREGOTT T. WINKLER.

Witnesses:
MYRTLE M. JACKSON,
K. M. IMBODEN.